United States Patent
Terry et al.

(10) Patent No.: US 10,708,010 B2
(45) Date of Patent: *Jul. 7, 2020

(54) METHOD AND APPARATUS FOR ALLOCATION OF PHYSICAL RESOURCES FOR UPLINK TRANSMISSIONS

(71) Applicant: InterDigital Technology Corporation, Wilmington, DE (US)

(72) Inventors: Stephen E. Terry, Northport, NY (US); Guodong Zhang, Syosset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,772

(22) Filed: Oct. 13, 2017

(65) Prior Publication Data
US 2018/0041313 A1   Feb. 8, 2018

Related U.S. Application Data

(63) Continuation of application No. 12/652,082, filed on Jan. 5, 2010, now Pat. No. 9,794,031, which is a
(Continued)

(51) Int. Cl.
*H04L 1/18* (2006.01)
*H04L 1/16* (2006.01)

(52) U.S. Cl.
CPC .......... *H04L 1/1883* (2013.01); *H04L 1/1812* (2013.01); *H04L 1/1877* (2013.01); *H04L 1/1607* (2013.01)

(58) Field of Classification Search
CPC ..... H04W 72/04; H04L 1/1883; H04L 1/1812
See application file for complete search history.

(56) References Cited

U.S. PATENT DOCUMENTS 6,424,625 B1   7/2002 Larsson et al.
6,519,223 B1   2/2003 Wager et al.
(Continued)

FOREIGN PATENT DOCUMENTS

EP   1 447 943   8/2004
EP   1 838 057   9/2007
(Continued)

OTHER PUBLICATIONS

3GPP2 C.S0002-C, "Physical Layer Standard for cdma2000 Spread Spectrum Systems", 3$^{rd}$ Generation Partnership Project 2 "3GPP2", Version 2.0, Revision C, Jul. 23, 2004.
(Continued)

*Primary Examiner* — Rhonda L Murphy
(74) *Attorney, Agent, or Firm* — Volpe and Koenig, P.C.

(57) ABSTRACT

A first allocation of physical resources for uplink transmission is received over a downlink signaling channel. Data of a logical channel is received. A first block is transmitted over the first allocated physical resources in response to receipt of the data of the logical channel. A timer is initiated in response to transmission of the first block. In response to an expiration of the timer and not receiving a second allocation of physical resources, a first type of request from a plurality of types of requests is selected and the selected first type of request for the second allocation of physical resources is transmitted over an uplink signaling channel. The second allocation of physical resources is received in response to the transmitted first type of request. A second block is transmitted in response to the second allocation of physical resources over the second allocated physical resources.

6 Claims, 2 Drawing Sheets

Related U.S. Application Data continuation of application No. 11/117,579, filed on Apr. 28, 2005, now Pat. No. 7,643,419.

(60) Provisional application No. 60/568,937, filed on May 7, 2004.

(56) References Cited

U.S. PATENT DOCUMENTS

| | | | |
|---|---|---|---|
| 6,628,946 | B1 | 9/2003 | Wiberg et al. |
| 6,665,416 | B1 | 12/2003 | Choi |
| 6,901,063 | B2 | 5/2005 | Vayanos et al. |
| 6,952,411 | B2 | 10/2005 | Sinnarajah et al. |
| 6,987,780 | B2 | 1/2006 | Wei et al. |
| 7,061,913 | B1 | 6/2006 | Abrol et al. |
| 7,161,916 | B2 | 1/2007 | Malladi et al. |
| 7,164,904 | B2 * | 1/2007 | Nagy .................. H04B 1/0003 455/403 |
| 7,197,313 | B1 | 3/2007 | Sohn |
| 7,260,401 | B2 | 8/2007 | Chen et al. |
| 7,301,988 | B2 | 11/2007 | Kanterakis |
| 7,366,477 | B2 | 4/2008 | Sebire et al. |
| 7,436,795 | B2 | 10/2008 | Jiang |
| 7,436,834 | B1 * | 10/2008 | Zhang .................. H04L 1/1671 370/389 |
| 7,505,774 | B1 * | 3/2009 | Trott .................... H04W 16/10 455/456.1 |
| 7,512,051 | B2 | 3/2009 | Hayashi |
| 7,545,765 | B2 | 6/2009 | Larsson et al. |
| 8,094,647 | B2 * | 1/2012 | Elliott .................. H04L 12/14 370/231 |
| 2002/0015419 | A1 | 2/2002 | Kim et al. |
| 2002/0172208 | A1 | 11/2002 | Malkamaki |
| 2003/0095519 | A1 | 5/2003 | Kuo et al. |
| 2003/0112824 | A1 | 6/2003 | Acosta |
| 2003/0123403 | A1 | 7/2003 | Jiang |
| 2003/0147348 | A1 | 8/2003 | Jiang |
| 2003/0210669 | A1 | 11/2003 | Vayanos et al. |
| 2003/0214935 | A1 | 11/2003 | Khan et al. |
| 2004/0037224 | A1 | 2/2004 | Choi et al. |
| 2004/0037327 | A1 | 2/2004 | Torsner et al. |
| 2004/0156332 | A1 | 8/2004 | Terry et al. |
| 2004/0208160 | A1 | 10/2004 | Petrovic et al. |
| 2004/0252658 | A1 | 12/2004 | Hosein et al. |
| 2005/0149470 | A1 | 7/2005 | Fujie |
| 2005/0207359 | A1 | 9/2005 | Hwang et al. |
| 2007/0008990 | A1 | 1/2007 | Torsner |
| 2013/0107837 | A1 * | 5/2013 | Terry .................... H04W 28/06 370/329 |

FOREIGN PATENT DOCUMENTS

| | | |
|---|---|---|
| JP | 10-056480 | 2/1998 |
| JP | 11-331261 | 11/1999 |
| JP | 2001-197078 | 7/2001 |
| JP | 2003-078565 | 3/2003 |
| JP | 2003-244087 | 8/2003 |
| WO | 00/60799 | 10/2000 |
| WO | 01/99353 | 12/2001 |
| WO | 03/039074 | 5/2003 |
| WO | 03/058852 | 7/2003 |
| WO | 04/049648 | 6/2004 |
| WO | 04/073273 | 8/2004 |

OTHER PUBLICATIONS

3GPP2 C.S0003-C, "Medium Access Control (MAC) Standard for cdma2000 Spread Spectrum Systems", 3$^{rd}$ Generation Partnership Project 2 "3GPP2", Version 2.0, Release C, Aug. 2004.

3GPP2 C.S0004-C, "Signaling Link Access Control (LAC) Standard for cdma2000 Spread Spectrum Systems", 3$^{rd}$ Generation Partnership Project 2 "3GPP2", Version 2.0, Revision C, Jul. 23, 2004.

3GPP2 C.S0005-C, "Upper Layer (Layer 3) Signaling Standard for cdma2000 Spread Spectrum Systems", 3$^{rd}$ Generation Partnership Project 2 "3GPP2", Version 2.0, Revision c, Jul. 23, 2004.

Motorola et al., "AH64: Text proposal for the TR—Section 7.5," 3GPPRAN1#31, R1-03-0359, Tokyo, Japan (Feb. 18-21, 2003).

Nokia, "Enhanced Uplink DCH," TSG-RAN WG1 #31 meeting, R1-03-0176, Tokyo, Japan (Feb. 18-21. 2003).

Samsung, "Relationship between scheduling and HARQ," 3GPP TSG-RAN WG1 #35 Meeting, R1-031224, Lisbon, Portugal (Nov. 17-21, 2003).

Third Generation Partnership Project, "Technical Specification Group Radio Access Network; FDD Enhanced Uplink; Overall description; Stage 2 (Release 6)," 3GPP TS 25.309 V6.2.0 (Mar. 2005).

Third Generation Partnership Project, "Technical Specification Group Radio Access Network; Medium Access Control (MAC) protocol specification (Release 1999)," 3GPP TS 25.321 V3.16.0 (Sep. 2003).

Third Generation Partnership Project, "Technical Specification Group Radio Access Network; Medium Access Control (MAC) protocol specification (Release 1999)," 3GPP TS 25.321 V3.17.0 (Jun. 2004).

Third Generation Partnership Project, "Technical Specification Group Radio Access Network; Medium Access Control (MAC) protocol specification (Release 4)," 3GPP TS 25.321 V4.9.0 (Sep. 2003).

Third Generation Partnership Project, "Technical Specification Group Radio Access Network; Medium Access Control (MAC) protocol specification (Release 4)," 3GPP TS 25.321 V4.10.0 (Jun. 2004).

Third Generation Partnership Project, "Technical Specification Group Radio Access Network; Medium Access Control (MAC) protocol specification (Release 6)," 3GPP TS 25.321 V6.1.0 (Mar. 2004).

Third Generation Partnership Project, "Technical Specification Group Radio Access Network; Medium Access Control (MAC) protocol specification (Release 6)," 3GPP TS 25.321 V6.4.0 (Mar. 2005).

Third Generation Partnership Project, "Technical Specification Group Radio Access Network; Medium Access Control (MAC) protocol specification (Release 5)," 3GPP TS 25.321 V5.8.0 (Mar. 2004).

Third Generation Partnership Project, "Technical Specification Group Radio Access Network; Medium Access Control (MAC) protocol specification (Release 5)," 3GPP TS 25.321 V5.10.0 (Dec. 2004).

Third Generation Partnership Project, "Technical Specification Group Radio Access Network; Physical channels and mapping of transport channels onto physical channels (TDD) (Release 6)," 3GPP TS 25.221 V6.3.0 (Mar. 2005).

Third Generation Partnership Project, "Technical Specification Group Radio Access Network; Physical channels and mapping of transport channels onto physical channels (TDD) (Release 6)," 3GPP TS 25.221 V6.0.0 (Dec. 2003).

Third Generation Partnership Project, "Technical Specification Group Radio Access Network; Physical channels and mapping of transport channels onto physical channels (TDD) (Release 5)," 3GPP TS 25.221 V5.5.0 (Jun. 2003).

Third Generation Partnership Project, "Technical Specification Group Radio Access Network; Physical channels and mapping of transport channels onto physical channels (TDD) (Release 4)," 3GPP TS 25.221 V4.7.0 (Dec. 2002).

Third Generation Partnership Project, "Technical Specification Group Radio Access Network; Physical channels and mapping of transport channels onto physical channels (TDD) (Release 1999)," 3GPP TS 25.221 V3.11.0 (Sep. 2002).

* cited by examiner

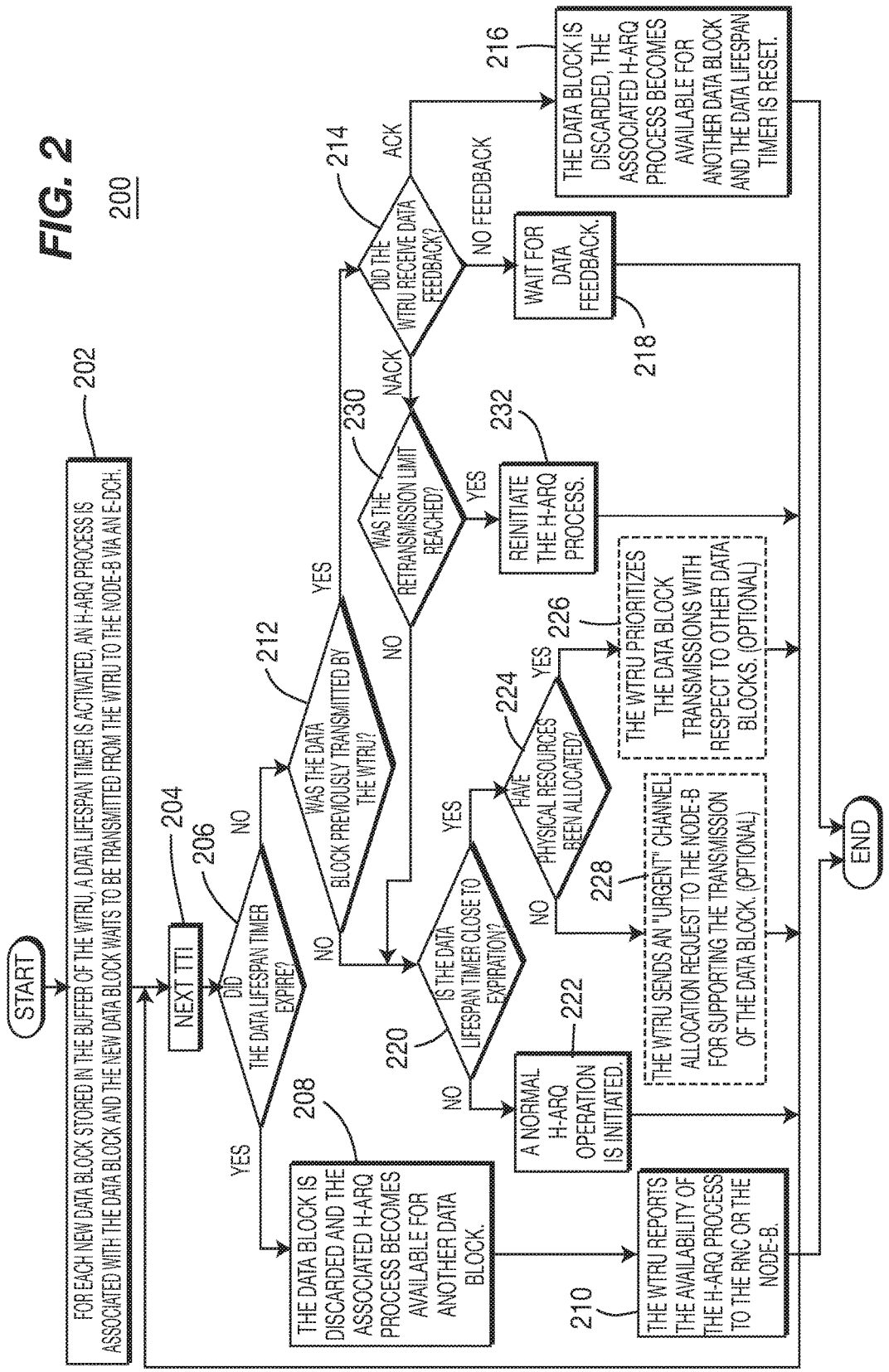

US 10,708,010 B2

METHOD AND APPARATUS FOR ALLOCATION OF PHYSICAL RESOURCES FOR UPLINK TRANSMISSIONS

CROSS REFERENCE TO RELATED APPLICATION

This application is a continuation of U.S. patent application Ser. No. 12/652,082, filed Jan. 5, 2010, which is a continuation of U.S. patent application Ser. No. 11/117,579, filed Apr. 28, 2005, now U.S. Pat. No. 7,643,419, which claims the benefit of U.S. Provisional Application No. 60/568,937, filed May 7, 2004, which are incorporated by reference as if fully set forth.

FIELD OF INVENTION

The present invention is related to a wireless communication system including at least one wireless transmit/receive unit (WTRU), at least one Node-B and a radio network controller (RNC). More particularly, the present invention is related to a method and apparatus for implementing a data lifespan timer for supporting enhanced dedicated channel (E-DCH) transmissions.

BACKGROUND

Methods for improving uplink (UL) coverage, throughput, and transmission latency are currently being investigated in Release 6 of the Third Generation Partnership Project (3GPP). In order to achieve these goals, the Node-B will take over responsibility of scheduling and assigning UL resources to WTRUs. The Node-B can make more efficient decisions and manage UL radio resources on a short-term basis better than an RNC. The RNC still retains coarse overall control of the cell with enhanced uplink (EU) services so that the RNC can perform functions such as call admission control and congestion control.

Hybrid-automatic repeat request (H-ARQ) techniques provide a procedure for generating transmissions and retransmissions with low latency. A primary aspect of H-ARQ techniques is that data received in failed transmissions is soft combined with successive retransmissions to increase the probability of successful reception.

When an H-ARQ scheme and Node-B scheduling of transmissions is used, the time required to successfully transmit data will vary. Applications requiring very low latency transmission can be adversely effected by significantly delayed transmissions. For example, delayed data may be considered to be a failed transmission and end up being unnecessarily retransmitted by the application. Therefore, a mechanism that limits transmission latency is required.

SUMMARY

The present invention is implemented in a wireless communication system which supports E-DCH data transmissions. The wireless communication system includes a wireless transmit/receive unit (WTRU), at least one Node-B and a radio network controller (RNC). The WTRU includes a data buffer, a data lifespan timer, a data retransmission counter, a hybrid-automatic repeat request (H-ARQ) process and a controller. The lifespan timer establishes a lifespan for at least one data block stored in the buffer. The WTRU is configured to (i) periodically determine whether the lifespan timer has expired, (ii) determine whether the data block was previously transmitted, (iii) determine whether the lifespan timer is close to expiration, and (iv) determine whether physical resources have been allocated. If physical resources have not been allocated for a data block associated with a lifespan timer that is close to expiration, the WTRU sends an urgent channel allocation request to the Node-B. If physical resources have been allocated, the data block is prioritized for transmission with respect to other data blocks. The data block is discarded if the lifespan timer expires or if the WTRU receives feedback information indicating that the data block was successfully received by the Node-B.

BRIEF DESCRIPTION OF THE DRAWINGS

A more detailed understanding of the invention may be had from the following description of a preferred embodiment, given by way of example and to be understood in conjunction with the accompanying drawing wherein:

FIG. 2 is a flow diagram of a process for implementing a data lifespan timer in the WTRU of the system of FIG. 1 in accordance with the present invention.

DETAILED DESCRIPTION OF THE PREFERRED EMBODIMENTS

Figure 1:
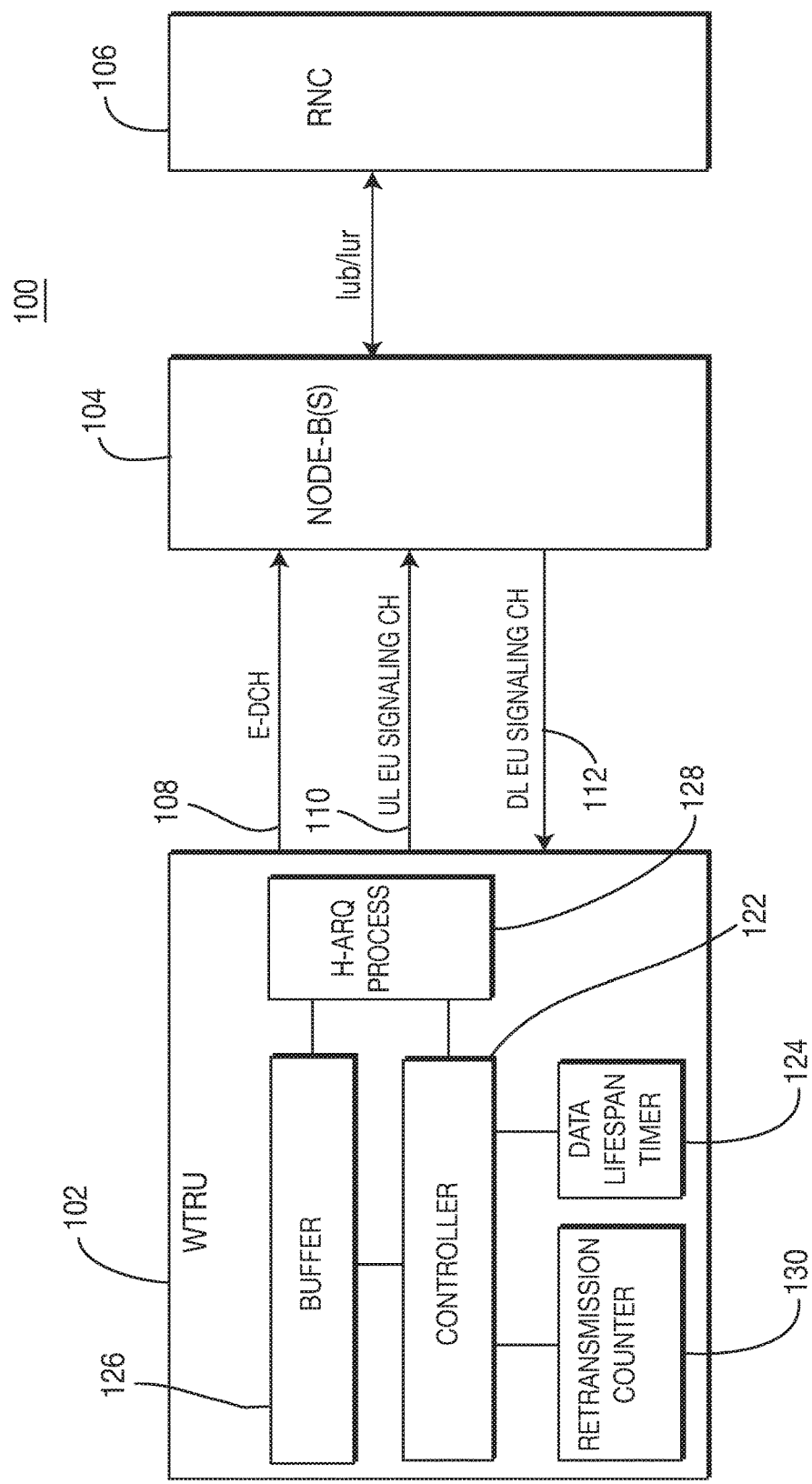
FIG. 1 is a block diagram of a wireless communication system operating in accordance with the present invention.

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

FIG. 1 is a block diagram of a wireless communication system 100 in accordance with the present invention. The system 100 comprises at least one WTRU 102, at least one Node-B 104 and at least one RNC 106. The WTRU 102 includes a controller 122, a data lifespan timer 124, a buffer 126, a plurality of H-ARQ processes 128 and optionally a retransmission counter 130. The controller 122 controls overall data transmission procedures including initiation of the data lifespan timer 124 and allocation of an H-ARQ process 128.

The RNC 106 controls overall EU operation of the system 100 by configuring EU parameters for the Node-B 104 and the WTRU 102 such as the lifespan time for transport channel (TrCH) or logical channel data, initial transmit power level, maximum allowed EU transmit power or available channel resources per Node-B 104. E-DCH is established for supporting EU transmissions between the WTRU 102 and the Node-B 104.

For the E-DCH transmissions, the WTRU 102 sends a channel allocation request to the Node-B 104 via a UL EU signaling channel 110. The channel allocation request, (or other UL EU signaling), may be transmitted via the E-DCH 108 instead of the UL EU signaling channel 110. In response, the Node-B 104 sends channel allocation information to the WTRU 102 via a downlink (DL) EU signaling channel 112. After EU radio resources are allocated for the WTRU 102, the WTRU 102 transmits data via an E-DCH 108. In response to the E-DCH data transmission, the Node-B 104 sends an acknowledgement (ACK) or non-acknowledgement (NACK) message for H-ARQ operation via the DL EU signaling channel 112.

FIG. 2 is a flow diagram of a process 200 for implementing a data lifespan timer 124 in the WTRU 102 for supporting E-DCH transmissions in accordance with the present invention. The WTRU 102 may handle multiple E-DCH transmissions simultaneously using a plurality of data lifespan timers 124.

When a new data block is received for transmission via the E-DCH 108, the controller 122 activates a data lifespan timer 124 for the data block, associates an H-ARQ process 128 with the data block and the new data block waits in the buffer 126 (step 202). The RNC configures the data lifespan for each E-DCH TrCH or for each E-DCH logical channel. Upon reception in MAC or RLC for UL transmission the timer is initialized for each transmission.

The value of E-DCH data lifespan timer 124 may be determined by the controller 122 in the WTRU 102 considering several factors such as maximum allowed transmission latency, RLC configuration, and the TrCH block error ratio (BLER) requirement, or the like. For example, the maximum allowed latency determines how long the data can be buffered before delivery. Furthermore, the BLER determines the number of H-ARQ retransmissions which effect transmission latency. The value assigned to the data lifespan timer 124 may also take into account WTRU data processing external to a medium access control entity for EU (MAC-e) in the WTRU 102.

Application protocols, (e.g., TCP/IP), require minimal transmission latency and variance in transmission latency to achieve maximum throughput. When transmission delays occur, data is expected to be failed and discarded, not delayed and retransmitted. This results in an inefficient behavior of the application.

For each TTI at step 204, the controller 122 determines whether the data lifespan timer 124 for the data block in the buffer 126 of the WTRU 102 has expired (step 206). If the data lifespan timer 124 has expired, the controller 122 discards the data block and releases the associated H-ARQ process 128 (step 208). The WTRU 102 may report this event to either the RNC 106 or the Node-B 104 (step 210). The WTRU 102 may further report to the Node-B 104 that physical resources allocations are not sufficient by sending a channel allocation request with a unique indication.

Referring back to step 206, if the data lifespan timer 124 for the data block has not expired, the controller 122 determines whether the data block in the buffer 126 of the WTRU 102 was previously transmitted by the WTRU 102 (step 212). If the data block had been previously transmitted, it is further determined whether data feedback information associated with the data block was received from the Node-B 104 (step 214). If an acknowledgement (ACK) message indicating successful transmission of the data block is received, the data block is discarded from the buffer 126, the associated H-ARQ process 128 becomes available for supporting another data block and the data lifespan timer is reset (step 216). If no feedback message is received, the WTRU 102 waits for the feedback message until the next TTI (step 218).

If, at step 212, it is determined that the data block had not been previously transmitted by the WTRU 102, or that the data block has been transmitted but a non-acknowledgement (NACK) message indicating unsuccessful transmission of the data block is received, the data block is retransmitted. The controller 122 determines whether the data lifespan timer 124 for the data block is close to expiration (step 220). If the data lifespan timer 124 is not close to expiration, a normal H-ARQ operation is initiated for transmitting the data block (step 222).

In step 224, the controller 122 determines whether physical resources have been allocated when the data lifespan timer 124 is close to expiration (step 224). If physical resources have been allocated, the controller 122 may optionally prioritize transmission of the data block (step 226). If physical resources have not been allocated, the controller 122 may optionally send an urgent channel allocation request to the Node-B for supporting the transmission of the data block (step 228).

Referring back to step 214, if a NACK message has been received, the data block is retransmitted, the controller 122 may determine whether the retransmission counter 130 has reached a maximum retransmission limit (step 230). The retransmission counter 130 is incremented each time the data block is retransmitted, and the maximum retransmission limit is configured by the RNC 106. If the retransmission counter 130 does not reach the maximum retransmission limit, the process 200 proceeds to step 220. If the retransmission counter 130 reaches the maximum retransmission limit, the controller 122 reinitializes the H-ARQ process 128 as long as the data lifespan timer 124 for the data block has not expired (step 232). The retransmission counter 130 is initialized and a new data indicator is incremented to indicate re-initiation of the H-ARQ process 128.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A wireless transmit/receive unit (WTRU) comprising:
a receiver;
a transmitter; and
a controller; wherein:
the receiver and the controller are configured to receive, over a downlink signaling channel, information indicating a first allocation of physical resources for uplink transmission;
the controller is further configured to receive data of a logical channel within the WTRU;
the transmitter and the controller are further configured to, in response to receipt of the data of the logical channel, transmit a first block over physical resources indicated in the information indicating a first allocation of physical resources for uplink transmission;
the controller is further configured to initiate a timer;
the transmitter and the controller are further configured to: in response to an expiration of the timer and not receiving information indicating a second allocation of physical resources for uplink transmission, select a first type of request from a plurality of types of requests and transmit a request of the selected first type of request over an uplink signaling channel;
the receiver and the controller are further configured to, in response to the transmitted request of the selected first type of request, receive information indicating a second allocation of physical resources for uplink transmission;
the transmitter and the controller are further configured to, in response to receipt of the information indicating a second allocation of physical resources for uplink transmission, transmit a second block over physical resources indicated in the information indicating a second allocation of physical resources for uplink transmission; and the transmitter and the controller are further configured to: select a second type of request from the plurality of types of requests based on receipt of data of a different logical channel and transmit a request of the second type of request, wherein the first type of request is a different type than the second type of request.

2. The WTRU of claim 1, wherein the transmission of the first block and the transmission of the second block use at least one hybrid automatic repeat request (H-ARQ) entity.

3. The WTRU of claim 1, wherein the antenna and the controller are configured to receive information indicating a third allocation of physical resources for uplink transmission in response to the transmitted request of the second type of request.

4. A method implemented by a wireless transmit/receive unit (WTRU), the method comprising:

receiving, over a downlink signaling channel, information indicating a first allocation of physical resources for uplink transmission;

receiving data of a logical channel within the WTRU;

transmitting a first block over physical resources indicated in the information indicating a first allocation of physical resources for uplink transmission in response to receipt of the data of the logical channel;

initiating a timer;

in response to an expiration of the timer and not receiving information indicating a second allocation of physical resources for uplink transmission, selecting a first type of request from a plurality of types of requests and transmitting a request of the selected first type of request over an uplink signaling channel;

receiving information indicating a second allocation of physical resources for uplink transmission in response to the transmitted request of the selected first type of request;

transmitting a second block over physical resources indicated in the information indicating a second allocation of physical resources for uplink transmission in response to receipt of the information indicating a second allocation of physical resources for uplink transmission;

selecting a second type of request from the plurality of types of requests based on receipt of data of a different logical channel, wherein the first type of request is a different type than the second type of request; and transmitting a request of the second type of request.

5. The method of claim 4, wherein the transmission of the first block and the transmission of the second block use at least one hybrid automatic repeat request (H-ARQ) entity.

6. The method of claim 4 further comprising receiving information indicating a third allocation of physical resources for uplink transmission in response to transmitting the request of the second type of request.

* * * * *